US008483289B2

(12) United States Patent
Wan

(10) Patent No.: US 8,483,289 B2
(45) Date of Patent: Jul. 9, 2013

(54) METHOD AND SYSTEM FOR FAST CHANNEL CHANGE

(75) Inventor: Wade Wan, Orange, CA (US)

(73) Assignee: Broadcom Corporation, Irvine, CA (US)

( * ) Notice: Subject to any disclaimer, the term of this patent is extended or adjusted under 35 U.S.C. 154(b) by 1382 days.

(21) Appl. No.: 12/105,127

(22) Filed: Apr. 17, 2008

(65) Prior Publication Data

US 2009/0262252 A1 Oct. 22, 2009

(51) Int. Cl.
*H04N 7/12* (2006.01)
(52) U.S. Cl.
USPC ............ 375/240.26; 375/240.01; 375/240.25
(58) Field of Classification Search
USPC ................... 375/240.01, 240.25, 240.226
See application file for complete search history.

(56) References Cited

U.S. PATENT DOCUMENTS

| 5,477,263 A * | 12/1995 | O'Callaghan et al. ........ 725/102 |
| 5,594,492 A * | 1/1997 | O'Callaghan et al. ........ 725/151 |
| 2005/0135783 A1 * | 6/2005 | Crinon ............................. 386/68 |
| 2005/0172314 A1 * | 8/2005 | Krakora et al. ................. 725/38 |
| 2005/0238099 A1 * | 10/2005 | Veltman .................... 375/240.15 |

\* cited by examiner

*Primary Examiner* — Sath V Perungavoor
*Assistant Examiner* — Geepy Pe
(74) *Attorney, Agent, or Firm* — Thomas|Horstemeyer, LLP

(57) ABSTRACT

Aspects of fast channel change of programs are presented. Initial pictures of a program may be decoded earlier and displayed longer than what is indicated by corresponding clock references. Additional pictures of the program may be decoded and displayed at time indicated by the clock references. Within the time period of the initial pictures, decoding timing advances of initial pictures may be reduced and corresponding picture displaying rates may converge to an intended constant frame rate used for additional pictures displaying. Pictures may be decoded and displayed when the corresponding data are available in a coded data buffer (CDB) and a decoded picture buffer (DPB), respectively. Depending on the implementation, the respective previous picture may be displayed when a decoded picture is available in the DPB.

18 Claims, 7 Drawing Sheets

METHOD AND SYSTEM FOR FAST CHANNEL CHANGE

CROSS-REFERENCE TO RELATED APPLICATIONS/INCORPORATION BY REFERENCE

Not Applicable.

FIELD OF THE INVENTION

Certain embodiments of the invention relate to signal processing. More specifically, certain embodiments of the invention relate to a method and system for fast channel change.

BACKGROUND OF THE INVENTION

Channel change time is an important part of the user experience for digital video or other digital image or content applications. Channel change time represents a delay from the time that a viewer selects a channel for a digital video application to the time that corresponding video information is displayed to the viewer. Channel change time may be a function of many different elements such as tuner acquisition time, encryption descrambling, post-decode processing, and the time required to present the first picture to the viewer after finding a random access point in a video stream. The random access point represents a point in the video stream where a decoder may begin decoding successfully.

Normally, a channel change may comprise locating the random access point and filling a compressed data buffer (CDB) with data starting from this access point, decoding a coded picture, placing the decoded picture in a decoded picture buffer, and presenting the picture to the viewer. The picture is decoded and presented at a time indicated by clock references such as a decoding time stamp (DTS) and a presentation time stamp (PTS) transmitted together with the coded picture.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method is provided for fast channel change, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for fast channel change. Various aspects of the invention may provide decoding of initial coded pictures of a particular program earlier than what may be indicated by clock references such as decoding time stamps (DTSs) while decoding additional coded pictures at times indicated by DTSs. Coded pictures may be stored in a compressed data buffer (CDB) and decoding may be started after the data for the coded pictures may be available in the CDB. The decoded picture may be stored in a decoded picture buffer (DPB). The initial decoded pictures may be removed from the DPB for displaying earlier than what is indicated by the clock references such as the presentation time stamps (PTSs). Additional decoded pictures may be displayed at a time when the PTSs may mature. The initial pictures may be displayed at a variable frame rate converging to an intended constant frame rate used for displaying additional decoded pictures of the program. A decoded picture may be displayed when the corresponding data may become available in the DPB, otherwise, a respective previous decoded picture may be displayed. Depending on implementation, when the corresponding data of the coded picture may be available in the DPB, the respective previous picture may be displayed.

Figure 1A:
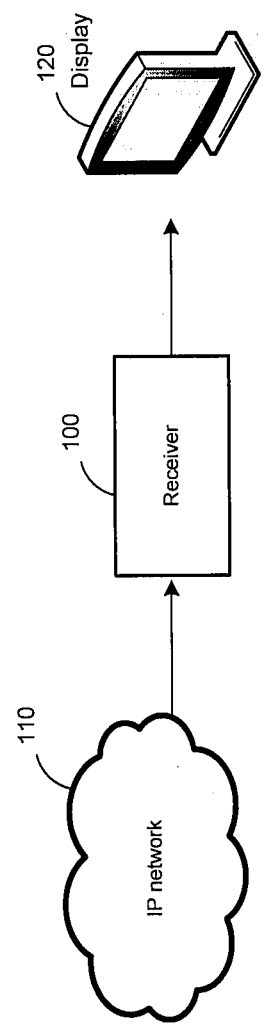
FIG. 1A is a block diagram of an exemplary system that may be utilized for fast channel change, in accordance with an embodiment of the invention.

FIG. 1A is a block diagram of an exemplary system that may be utilized for fast channel change, in accordance with an embodiment of the invention. Referring to FIG. 1A, there is shown a receiver 100, an IP network 110, and a display 120.

The IP network 110 may comprise suitable logic, devices and/or code that may enable data communication via various network wired and/or wireless technologies over Internet. The IP network 110 may comprise various IP-based networks such as WLAN. The IP network 110 may be connected to Internet and Internet Protocol (IP) may be used as the network layer protocol for data traffic. Data in the IP network may be encapsulated and sent over Internet in a packet stream, such as in packet switched networks.

The receiver 100 may comprise suitable logic, circuitry and/or code that may be enabled to receive and decode a packet stream from the IP network 110. The receiver 100 may be wired and/or wirelessly enabled. The received packet stream may be decoded at a time indicated by respective embedded time information such as DTSs. The receiver 100 may manage timings of decoding and/or displaying for a reduced channel change time. The receiver 100 may be enabled to decode an initial portion of the packet stream so that it may be displayed at a time earlier than the time indicated by time information derived from the packet stream.

The display 120 may comprise suitable logic, circuitry and/or code that may enable processing of an incoming video signal to present high-resolution and accurate pictures. Various imaging processing may be applied to optimize image, for example, for size and/or quality. For example, the display 120 may take advantage of the knowledge that certain areas of video may be currently unused and may implement some algorithms that reduce the effects of uneven screen aging. The incoming video signal may be displayed in an intended duration at time indicated by the time information associated with the video signal such as PTSs. The display 120 may be enabled to display an initial portion of the packet stream earlier than the time indicated by time information derived from the packet stream, but longer than the intended duration to compensate for respective display timing advancement.

In operation, the receiver 100 may receive a packet stream from the IP network 110. The receiver 100 may decode the received packet stream and pass to the display 120 for displaying at a time indicated by the associated time information of the received packet stream. The packet stream may have experienced various delay variations when transferred over the IP network 100. The receiver 100 may be enabled to reduce the delay variations by managing the respective timings on decoding and displaying such that the initial portion of the received packet stream may be decoded and displayed earlier than what may be indicated by time information associated with the initial portion of the packet stream such as DTSs and PTSs. The display 120 may apply extend picture displaying durations for the initial portion of the packet stream to compensate respective display timing advances.

Figure 1B:
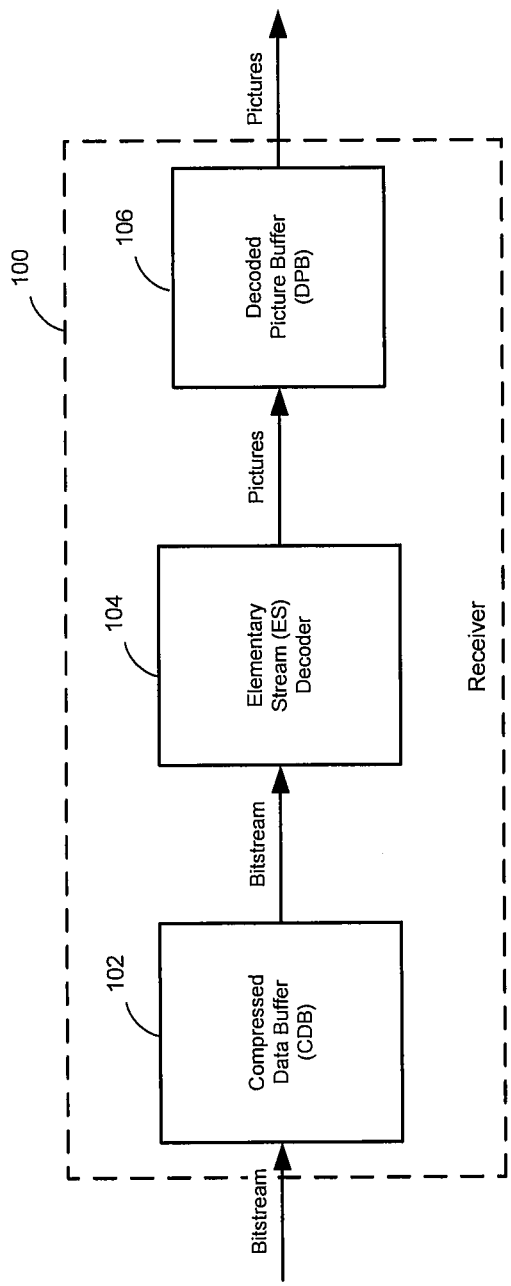
FIG. 1B is a block diagram illustrating an exemplary receiver that may be utilized for audio-visual decoding, in accordance with an embodiment of the invention.

FIG. 1B is a block diagram illustrating an exemplary receiver that may be utilized for audio-visual decoding, in accordance with an embodiment of the invention. Referring to FIG. 1B, there is shown the receiver 100 comprising a compressed data buffer (CDB) 102, an elementary stream (ES) decoder 104, and a decoded picture buffer (DPB) 106.

The CDB 102 may comprise suitable logic, circuitry and/or code that may be used to compensate for delay variations that may be associated with incoming coded pictures. The size of the CDB 102 may depend, for example, on a size of a statistical bound of the delay variations. This bound may be chosen depending on, for example, the maximum tolerated delay of the system and the packet loss rate. The CDB 102 may be managed based on values of decoding time stamps (DTS) of the coded pictures in the CDB 102. The DTS may be transmitted as part of the coded pictures or the DTS may be computed. The DTS of a particular coded picture may represent the latest possible time that the ES decoder 104 may start decoding the coded picture. In this regard, when data for the coded picture may be available in the CDB 102, the coded picture data may be removed from the CDB 102 and decoding may occur at a time instant no later than the time indicated by the DTS of the coded picture. The time for the first picture to be removed from the CDB 102 to start decoding by the ES decoder 104 may be related to a change channel time of the program to which the picture belongs. To reduce the change channel time, the first picture in the program may be removed from the CDB 102 so that the ES decoder 104 may start decoding after the data for the first coded picture becomes available in the CDB 102, but before the DTS of the first picture may mature. The resulting advances in decoding time may be spread over the initial couple of program pictures and converge such that decoding of additional pictures of the program may start at time indicated by their respective DTSs.

The ES decoder 104 may comprise suitable logic, circuitry and/or code that may be operable to decompress input compressed data into an elementary stream (ES) as aligned bytes to output pictures in the correct display order. The ES decoder 104 may comprise a system time clock (STC), which may be used for signaling sampling during decoding. During encoding, Program Clock Reference (PCR) values are inserted in the transport stream (TS) or the program stream (PS) as the time stamps of the STC. The ES decoder 104 may be enabled to extracted the PCR values and use them for synchronization.

The DPB 106 may comprise suitable logic, circuitry and/or code that may enable buffering of decoded pictures. The DPB 106 may be enabled to store a number of decoded pictures which may be used as reference pictures and/or for reordering of decoded pictures. Received decoded pictures may be examined so as to determine whether or not they should be added to the DPB 106. An initial delay may be incurred as the DPB 106 to be filled with the decoded pictures. Pictures that are no longer needed for displaying may be removed from the DPB 106. The presentation time stamps (PTSs) of the decoded pictures stored in the DPB 106 may indicate when a particular picture may be displayed. The removal of the particular decoded picture from the DPB 106 for displaying may be governed by the PTS value of the decoded picture. The decoded picture may be removed from the DPB 106 for presentation no later than the time indicated by the PTS of the decoded picture.

Assume that the frame rate is the same at both picture decoding and picture displaying. Variations in picture decoding duration may results in the same variations in picture displaying duration. The first picture of the program may be removed from the DPB 106 for displaying after all the data for the first decoded picture may become available in the DPB 106, but before the PTS of the first picture may mature. The resulting display time advances may be spread over a couple of initial decoded pictures of the program and may converge such that additional pictures of the program may start displaying at time indicated by respective PTSs. Longer display durations may be expected for the initial pictures of the program and the durations may converge to an intended display duration used for displaying additional pictures of the program. The selection of various display durations for initial pictures of the program may be implementation and/or application dependent. For example, the display durations of the initial pictures of the program may be monotonically decreased to the intended displaying duration while increasing picture index.

In operation, a random access point in an incoming elementary stream may be detected on the decoder side of an audio-visual coding system as shown in FIG. 1B. The CDB 102 may be filled with data of the elementary stream starting from this point. The ES decoder 104 may start decoding the first coded picture after the CDB 102 may have the respective data, but before the DTS of the first coded picture may mature. The resulting first decoded picture from the ES decoder 104 may be placed in the DPB 106. When the data of the first decoded picture may be complete and available in the DPB 106, the first decoded picture may be removed from the DPB 106 and presented before the PTS of the first decoded picture may mature. Accordingly, the earlier first picture decoding and presenting may aid in providing a reduced overall change channel time of the audio-visual coding system. The first decoded picture may be displayed earlier than indicated by the respective PTS but may last longer than intended.

The data of the program may continuously fill in the CDB 102. The ES decoder 104 may start decoding the second coded picture after the data of the second coded picture may be available and complete in the CDB 102, but before the DTS of the second coded picture may mature. The resulting second decoded picture from the ES decoder 104 may fill in the DPB 106. When the data of the second decoded picture may be available and complete in the DPB 106, the second decoded picture may be removed from the DPB 106 and presented before the PTS of the second decoded picture may mature. The second decoded picture may be displayed earlier than indicated by the respective PTS but may last longer than intended. The decoding and presenting advances of the second picture may be selected to be, for example, closer to the time indicated by the respective DTS and PTS compared to the first picture of the program.

The process may continue and the time for decoding and presenting may get closer and closer to the time indicated by respective DTS and PTS over initial couple pictures of the program. In other words, gradual convergence of the decoding and presenting time to the DTS and PTS occur, respectively. As a result, a time will be reached when decoding and presenting of additional pictures of the program occurs as indicated by respective DTS and PTS.

Figure 2:
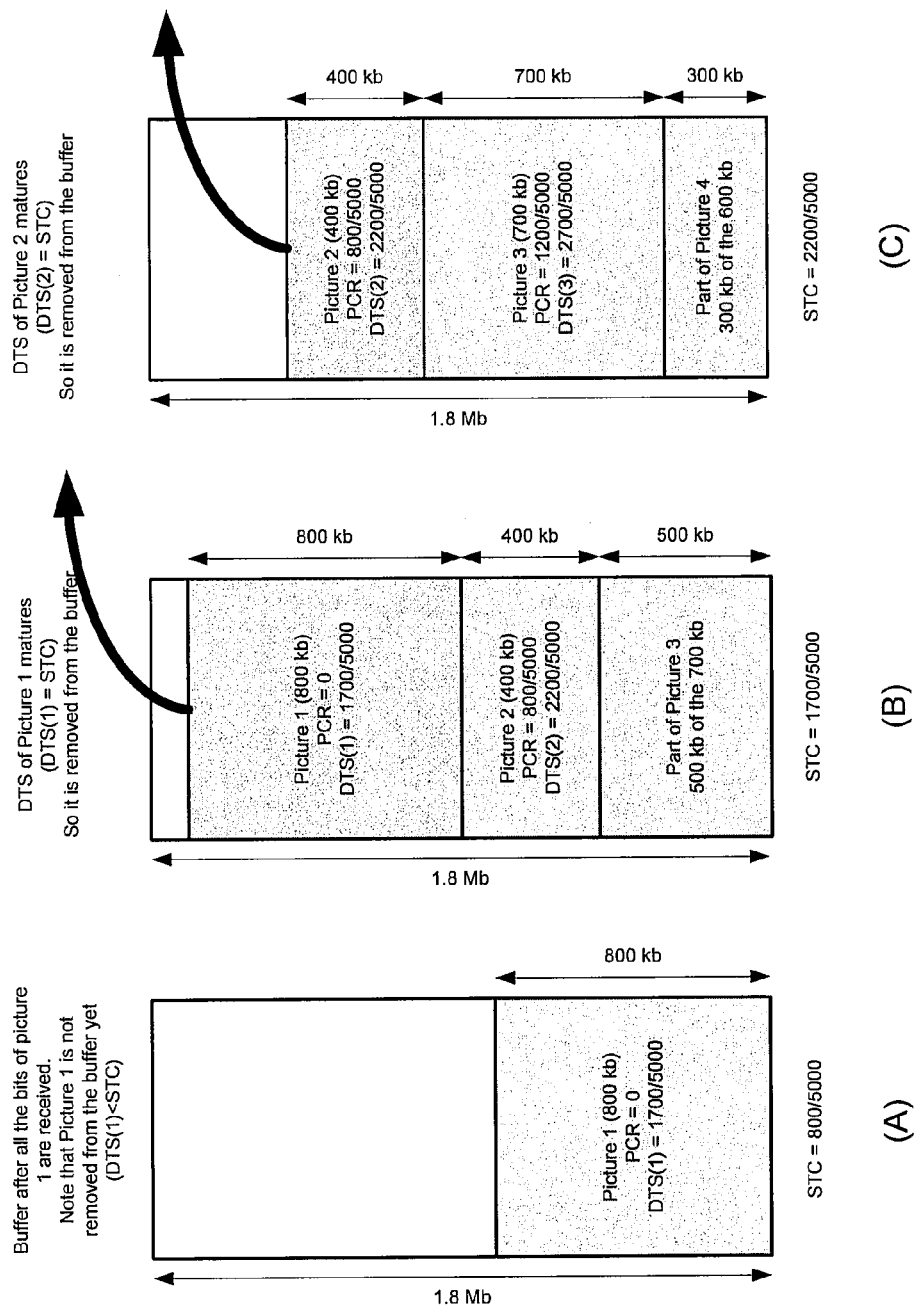
FIG. 2 is a block diagram of an exemplary compressed data buffer (CDB) buffer management for audio-visual decoding, in connection with an embodiment of the invention.

FIG. 2 is a block diagram of an exemplary CDB buffer management for audio-visual decoding, in connection with an embodiment of the invention. Referring to FIG. 2, there is shown a CDB buffer level status (A), a CDB buffer level status (B), and a CDB buffer level status (C).

It may be assumed that a coded data buffer such as the CDB 102 may have a capacity of 1.8 Mb. The CDB 102 may be filled at a bit rate of 500 kbps. An intended frame rate of a program is 10 frames per second (fps). The initial four coded pictures of the program are: {800 kb, 400 kb, 500 kb, 700 kb}. Associated clock references such as, for example, DTS and PTS of the initial four pictures are:

$$\{PCR, DTS\} = \left\{0, \frac{1700}{5000}\right\}, \left\{\frac{800}{5000}, \frac{2200}{5000}\right\},$$
$$\left\{\frac{1200}{5000}, \frac{2700}{5000}\right\}, \left\{\frac{1900}{5000}, \frac{3200}{5000}\right\}, \text{respectively.}$$

The CDB buffer level status A may correspond to the CDB 102 where the data of the first coded picture may have been received and filled in the CDB 102. The first coded picture may not be removed before the respective data may be available and complete in the CDB 102. Removing the first coded picture from the CDB 102 immediately after the respective data may be available in the CDB 102 may cause buffer underflow to occur when attempting to decode subsequent coded pictures.

The CDB buffer level status B may correspond to the CDB 102 where the CDB 102 may be filled with data for the second and the third coded pictures in addition to the first coded picture. The first coded picture may be removed from the CDB 102 for decoding no later than when the DTS of the first picture may mature. Otherwise, the CDB 102 may overflow if the next coded picture may have a size greater than 100 kb. The time to start decoding the first coded picture may be selected in [800/5000, 1700/5000] depending on implementation and applications.

The CDB buffer level status C may correspond to the CDB 102 where the CDB 102 may be filled with data for the fourth coded picture in addition to the first three coded pictures and the first coded picture may have been removed for decoding. The second coded picture may be removed from the CDB 102 for decoding no later than when the DTS of the second picture may mature. Otherwise, the CDB 102 may overflow if the next coded picture may have a size greater than 400 kb. The time to start decoding the second coded picture may be selected depending on implementation and applications, but before 2200/5000 and after the first coded picture removal from the CDB 102. The time for starting decoding the second coded picture may approach closer to the respective DTS compared to the decoding time of the first picture with respect to the respective DTS.

Figure 3:
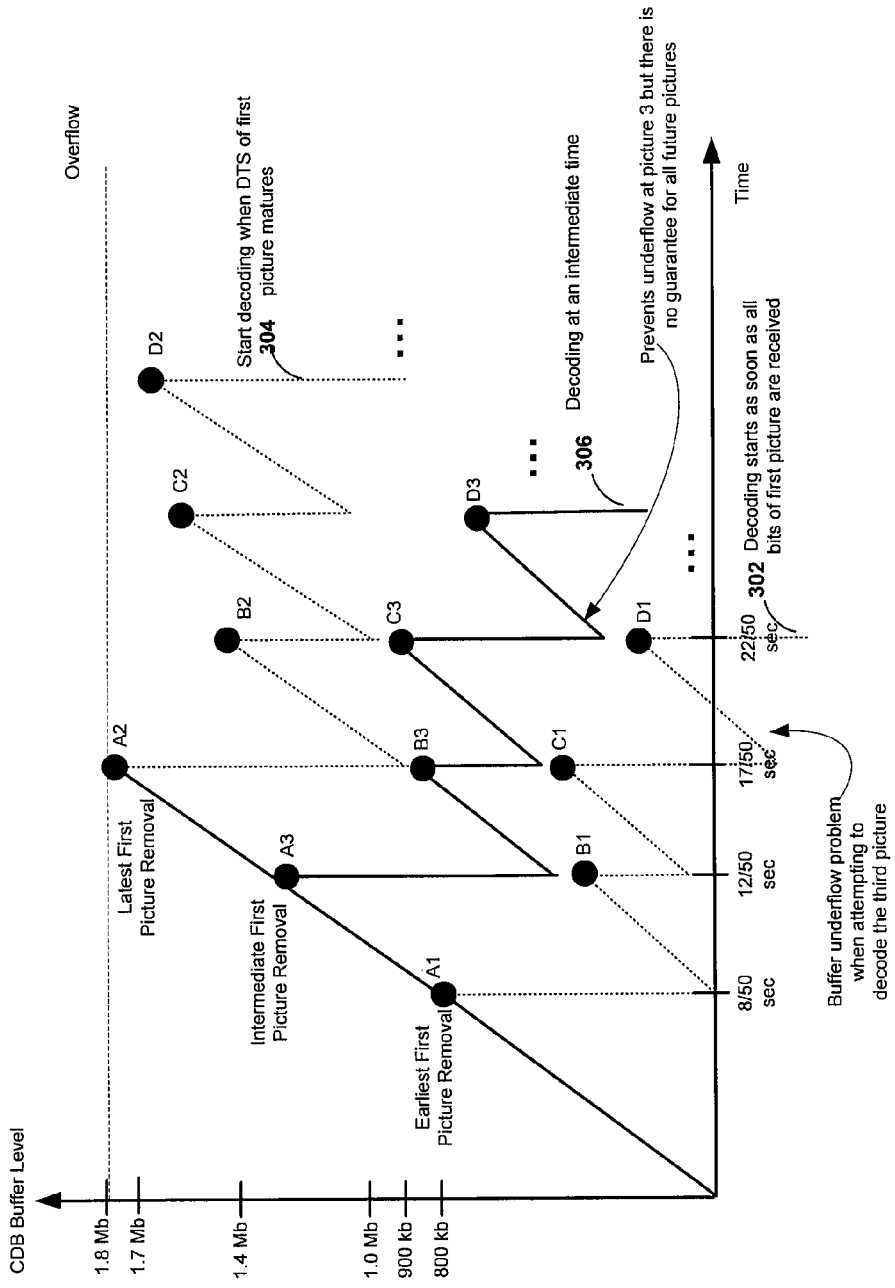
FIG. 3 is an exemplary plot of CDB levels corresponding to a constant output frame rate for a CDB for audio-visual decoding, in connection with an embodiment of the invention.

FIG. 3 is an exemplary plot of CDB buffer levels corresponding to a constant output frame rate for a CDB for audio-visual decoding, in connection with an embodiment of the invention. Referring to FIG. 3, there is shown a buffer level plot 302, a buffer level plot 304, and a buffer level plot 306. FIG. 3 may utilize similar exemplary system parameters as described with respect to FIG. 2.

Referring to plot 302, the point A1 may represent the removal of the first coded picture of 800 kb from the CDB 102 at a STC of 800/5000 sec. Decoding of the first coded picture may start immediately after the bits of the first coded picture may be complete and available in the CDB 102. The buffer level of the CDB 102 may be dropped down to zero with the immediate removal of the first coded picture at the point A1. To maintain the intended frame rate of 10 fps for the CDB 102, the second coded picture may be removed for decoding in $\frac{1}{10}$ sec after the removal of the first coded picture at A1. During the time period of $\frac{1}{10}$ sec, a total of 500 kb may be filled in the CDB 102 at the bit rate of 5000 kbps. The data for the second coded picture of 400 kb may be available and complete in the CDB 102 at STC=1200/5000 and decoding of the second coded picture may start at the point B1. The buffer level of the CDB 102 may be reduced to 100 kb with the removal of the second picture at the point B1. The process may continue with the third coded picture of 700 kb to be removed from the CDB 102 at STC=1700/5000 sec. However, a total of 600 kb out of 700 kb of the third coded picture may be available inside the CDB 102 at the STC 1700/5000. Accordingly, the CDB 102 may start experiencing buffer underflow. The CDB 102 may continue experience underflow, for example, at the point D1 when starting decoding the fourth coded picture of the program.

Referring to plot 304, the point A2 may represent the removal of the first picture of 800 kb from the CDB 102 when the DTS of the first picture may mature. A total of 1800 kb may be available in the CDB 102 at the point A1. The buffer level of the CDB 102 may be reduced to 1000 kb with the removal of the first picture at the point A2. To maintain the intended frame rate of the 10 fps for the CDB 102, the second coded picture may be removed at the point B2 indicating a STC of 2200/5000 sec. A total of 1500 kb coded data may be available in the CDB 102 at the point B2. The data for the second coded picture of 400 kb may exist completely in the CDB 102 and decoding of the second coded picture may start when the DTS of the second coded picture may mature. The buffer level of the CDB 102 may be dropped down to 1100 kb with the removal of the second coded picture at the point B2. The third coded picture of 500 kb may be decoded at a STC of 2700/5000 sec. A total of 1600 kb coded data may be available in the CDB 102 at the point C2.

The data for the third coded picture of 500 kb may exist completely in the CDB 102 and decoding of the third coded picture may start when the DTS of the third coded picture may mature. The buffer level of the CDB 102 may be reduced to 1100 kb with the removal of the third coded picture at the point C2. The process may continue with the fourth coded picture of 700 kb that may be expected decoded at a STC of 3200/5000 sec. A total of 1600 kb of coded data may be available in the CDB 102 at the point D2. The data for the fourth coded picture of 700 kb may exist in the CDB 102 and decoding of the fourth coded picture may start when the DTS of the fourth picture may mature. The buffer level of the CDB 102 may be dropped down to 900 kb with the removal of the fourth picture at the point D2.

On the plot 304, the buffer underflow problem may not exist when the removal of the first coded picture may be delayed until the data for the second coded picture may be available in the CDB 102. Each coded picture may be removed when the respective DTS may mature. However, the delay of the first coded picture decoding may cause an increase in the change channel time of the program.

On the plot 306, the point A3 may represent that the first coded picture of 800 kb may be removed from the CDB 102 in an intermediate time after the bits of the first picture may become available completely in the CDB 102, and before the DTS of the first coded picture may mature. The point A3 may be picked properly to prevent the underflow problem in the CDB 102 while maintaining the CDB 102 output at the intended frame rate of 10 fps. For example, the first three coded pictures may be decoded without buffer underflow at the point A3, B3, and C3, respectively. The reduction of the first coded picture decoding time may reduce the change channel time of the program. However, the prevention of the buffer underflow problem may not be guaranteed for the future coded pictures of the program such as the fourth coded picture at the point D3.

Figure 4:
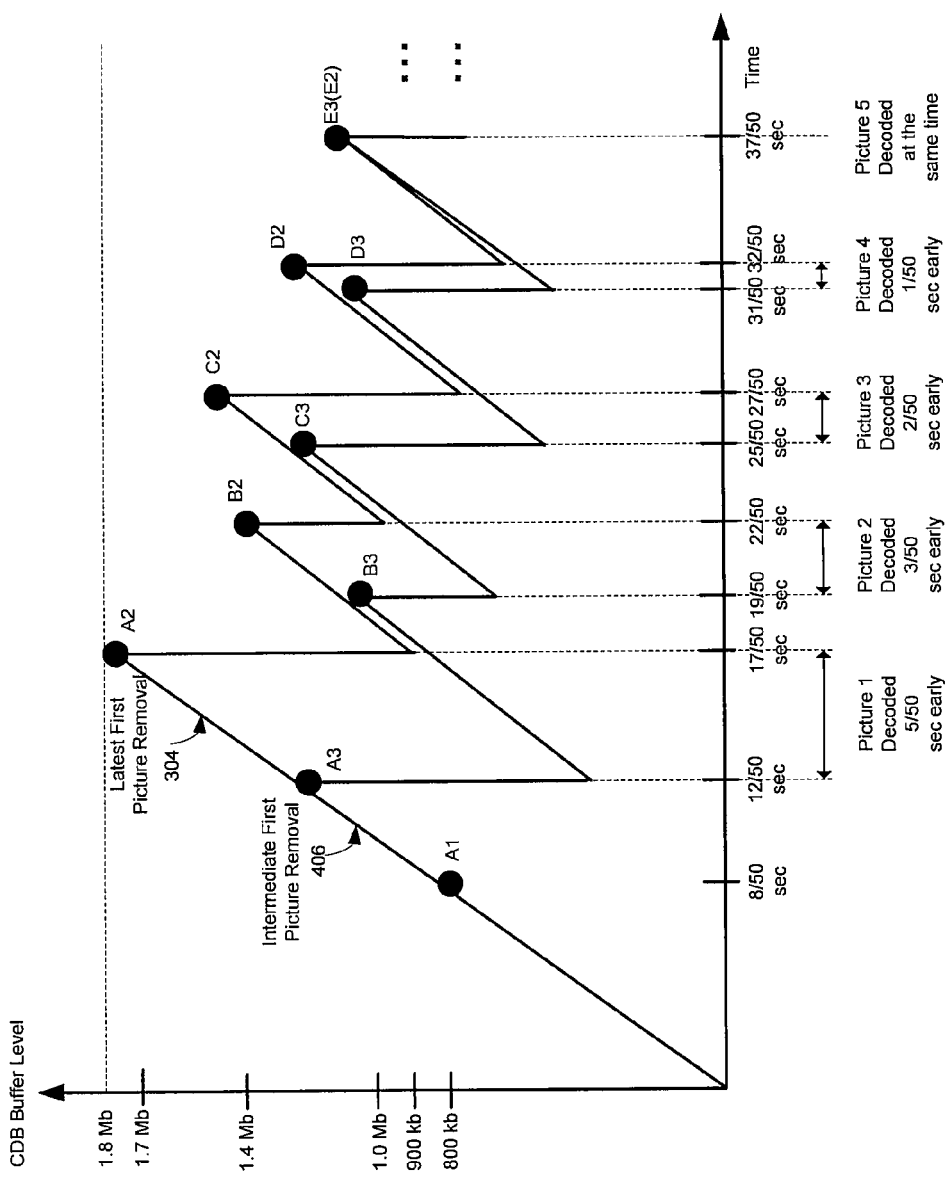
FIG. 4 is an exemplary plot of CDB levels corresponding to a variable output frame rate on initial pictures for a CDB in audio-visual decoding, in accordance with an embodiment of the invention.

FIG. 4 is an exemplary plot of CDB buffer levels corresponding to a variable output frame rate on initial pictures for a CDB in audio-visual decoding, in accordance with an embodiment of the invention. Referring to FIG. 4, there is shown the buffer level plot 304 and a buffer level plot 406.

The plot 406 may represent to prevent underflow problem in the CDB 102 management by applying variable frame rates to initial coded pictures of the program as a continuation of the discussions in FIG. 3. The variable frame rates may converge to the intended frame rate of 10 fps after the initial pictures.

Decoding of the first coded picture may start at the point A3 where the point A3 may indicate that the first coded picture of 800 kb may be removed from the CDB 102 in an intermediate time after the bits of the first picture may become completely available in the CDB 102, and before the DTS of the first coded picture may mature. The selection of the point A3 may be determined by various parameters such as, for example, the sizes of dynamic coded picture sequence of the program, the size of the CDB 102, the data filling rate of the CDB 102, and the output frame rate of the CDB 102. The first coded picture may be decoded 5/50 or 1/10 sec early compared to the decoding timing for the first picture at the point A2 where decoding of the first coded picture may start when the DTS of the first coded picture may mature.

The second coded picture may be removed from the CDB 102 for decoding at the point B3 with a STC of 19/50 sec. This may result in a frame rate of 50 frames per 7 sec and 3/50 sec early decoding compared to the case where decoding of the first coded picture may start at the point A2 with the frame rate of 10 frames per sec.

The third coded picture may be removed from the CDB 102 for decoding at the point B3 with a STC of 25/50 or 1/2 sec. This may result in a frame rate of 50 frames per 6 sec and 2/50 sec early decoding compared to the case where decoding of the first coded picture may start at the point A2 with the frame rate of 10 frames per sec.

The fourth coded picture may be removed from the CDB 102 for decoding at the point B3 with a STC of 31/50 sec. This may result in a frame rate of 50 frames per 6 sec and 1/50 sec early decoding compared to the case where decoding of the first coded picture may start at the point A2 with the frame rate of 10 frames per sec.

The fifth coded picture may be removed from the CDB 102 for decoding at the point B3 with a STC of 37/50 sec. This may result in a frame rate of 50 frames per 6 sec and the same decoding timing compared to the case where decoding of the first coded picture may start at the point A2 with the frame rate of 10 frames per sec.

The process may continue for future coded pictures with the constant frame rate of 10 frames per sec. In this process, the channel change time of the program may be reduced by an early first coded picture decoding and the underflow may be prevented by applying a variable frame rate for initial coded pictures. The process may proceed by applying the intended constant frame rate for future coded pictures processing.

Figure 5:
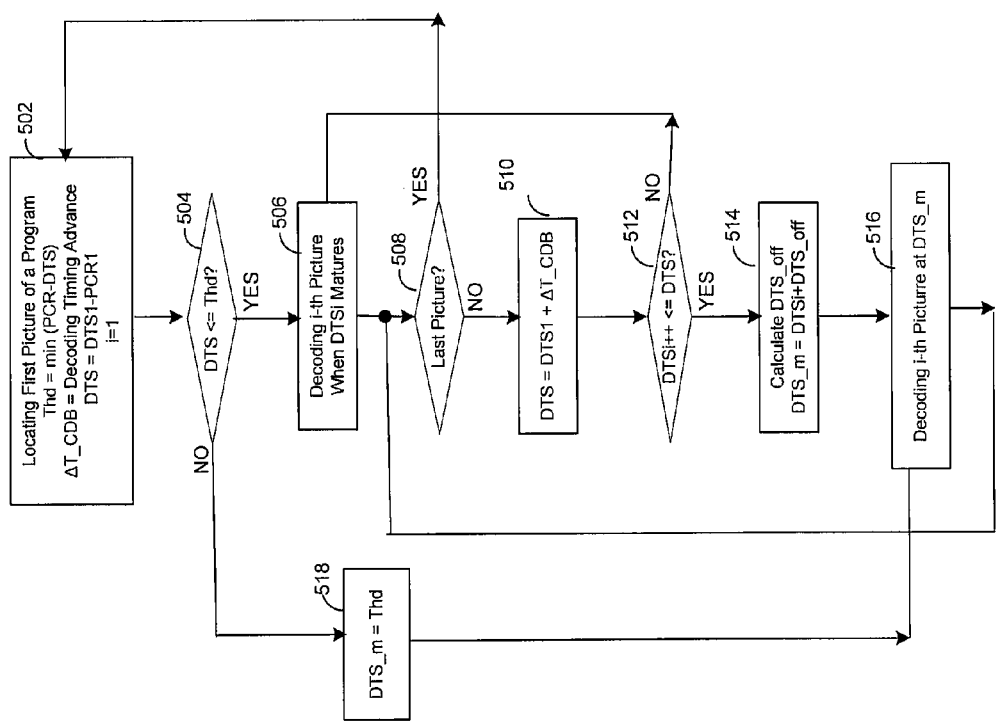
FIG. 5 is a flow chart that illustrates exemplary steps for a fast channel change by modifying picture decoding timing, in accordance with an embodiment of the invention.

FIG. 5 is a flow chart that illustrates exemplary steps for a fast channel change by modifying picture decoding timing, in accordance with an embodiment of the invention. Referring to FIG. 5, the exemplary steps may begin with step 502, where the CDB 102 may be filled with data of the coded essential bitstream and the first picture (the entry point) of a program may be located by detecting a random access point for the program. A threshold value Thd=min|PCR-DTS| and a timing advance $\Delta T\_CDB$ may be specified. The threshold value Thd may represent a minimum delay for pictures of the program and the timing advance $\Delta T\_CDB$ may indicate a decoding timing advance allowed at the CDB 102 before the buffer levels may match the intended buffer management. For example, decoding of a picture may start in advance of $\Delta T\_CDB$ before the DTS of the picture may mature. The actual difference of DTS1-PCR1, where DTS1 and PCR1 are the clock references DTS and PCR of the first picture at the random access point, may be computed and the picture index may be reset to i=1.

In step 504, the calculated DTS1-PCR1 may be compared to the threshold Thd. In instances where the actual DTS1-PCR1≦Thd, then in step 506, the first picture may start decoding when the DTS1 may mature. In step 508, it may be determined whether the last picture of the program may be reached by checking the picture index. In instances where the current picture may be an intermediate picture of the program, then in step 510, calculate a reference DTSref=DTS1+$\Delta T\_CDB$, where DTS1 may be the DTS of the first picture and $\Delta T\_CDB$ may be the allowed decoding timing advance at the CDB 102 for the pictures of the program. In step 512, the picture index may be increased by one step and DTSi may be compared to DTSref. In instances where DTSi≦DTSref, then in step 514, an offset in DTS may be calculated and a modified DTS for the i-th picture may be computed by DTSm=DTSi+DTSoff. The DTSoff may represent amount of time that the i-th picture may start decoding before the DTS of the picture may mature.

Various methods may be used for computing the DTSoff for the i-th picture. For example, the DTSoff may be calculated by the following monotonically decreasing function:

$$DTS_{off} = \frac{DTS_1 - DTS_1}{\Delta T_{CDB}}[(DTS_1 - PCR_1) - Thd].$$

In step 516, the i-th picture may be removed from the CDB 102 for decoding at the DTSm. In step 504, in instances where the actual DTS1-PCR1>Thd, then in step 518, a modified DTS for the first picture may be by DTSm=Thd. In step 508, in instances where the current picture may be the last picture of the program, then step 502 may be executed to search for a random access point of a new program. In step 512, in instances where DTSi>DTSref, then go to the step 506.

Figure 6:
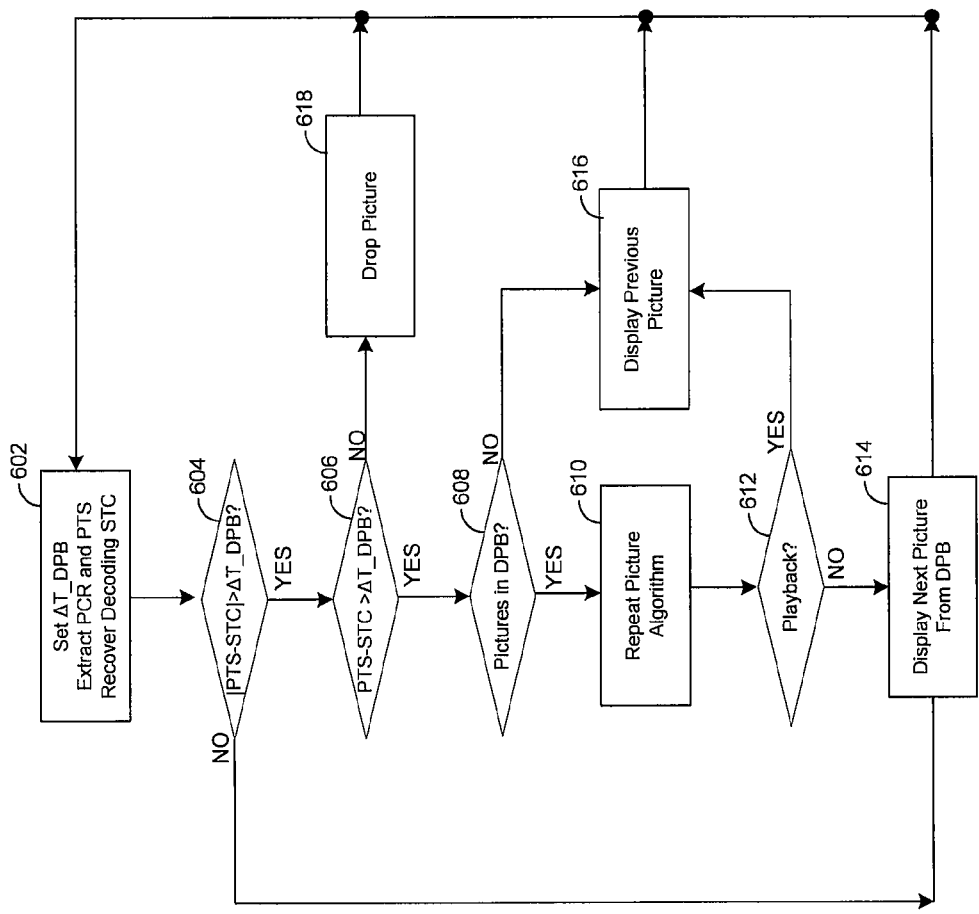
FIG. 6 is a flow chart that illustrates exemplary steps for a fast channel change by modifying picture display timing in a display manager, in accordance with an embodiment of the invention.

FIG. 6 is a flow chart that illustrates exemplary steps for a fast channel change by modifying picture display timing in a display manager, in accordance with an embodiment of the invention. Referring to FIG. 6, the exemplary steps begin in step 602, where an allowed display timing advance $\Delta T\_DPB$ may be set. The display timing advance $\Delta T\_DPB$ may be selected based on user configuration and/or type of application. Clock references such as PTS and PCR of a decoded picture of a program may be extracted from the picture. The decoder STC may be recovered by, for example, comparing the current STC value to the PCR value. In step 604, displaying timing of the picture may be checked to determine whether the current picture may be on-time by comparing $|PTS-STC|$ with $\Delta T\_DPB$. In instances where $|PTS-STC|>\Delta T\_DPB$, which may indicate that the current picture may not be on-time, then in step 606, the PTS-STC may be compared with $\Delta T\_DPB$ to determine whether the current picture may need to be displayed early. In instances where $PTS-STC>\Delta T\_DPB$, which may indicate that the current picture may be displayed before the PTS may mature, then in step 608, the buffer levels of the DPB 106 may be checked to determine whether there may be pictures available in the DPB 106.

In instances where there may be some pictures available in the DPB 106 to be displayed, then in step 610, it may be determined which decoded picture such as the current or the previous may be displayed via a repeat picture algorithm. Various repeat picture algorithms may be utilized and a particular repeat picture algorithm may depend on implementation and/or application type. One example of such a repeat picture algorithm may be, for example, select N pictures in the past before the current one, track each of the N pictures and display the next picture from the DPB 106 only if any of the N pictures may have been repeated. Longer display durations may be expected for the initial pictures of the program and the durations may converge to an intended display duration used for displaying additional pictures of the program. The selection of N and various display durations for initial pictures of the program may be adaptive depending on applications and user configurations. For example, for proper audio start-up and/or lip sync, the appropriate audio packets may be available while the corresponding video packets on display. The N may be picked to maintain the lip sync not only at the start but also for the duration of each of the pictures in responsive to the durations longer than the intended frame rate for the initial pictures of the program as presented in FIG. 4.

In step 612, in instances where no picture playback in the display manager may be determined via the repeat picture algorithm in the step 610, then in step 614, the next picture from the DPB 106 may be displayed and go back to the step 602 to start evaluating future pictures in the display manager. Otherwise, in step 616, the display manager may repeat a previous picture for display, and then go back to the 602. In step 604, in instances where $|PTS-STC|\leq\Delta T\_DPB$, indicating that the current picture in the display manager may be on-time, then in step 618. In step 606, in instances where $PTS-STC\leq\Delta T\_DPB$, indicating the current picture may be displayed after the PTS may mature, then in step 614, the display manager may just drop the picture, and then go back to the step 602. In step 608, in instances where there may be no pictures available in the DPB 106 to be displayed, then in step 616, the display manager may repeat a previous picture for display, and then go back to the step 602.

Aspects of a method and system for fast channel change techniques are provided. In accordance with various embodiments of the invention, initial coded pictures of a program stored in the CDB 102 may be removed and decoding of pictures may start earlier than indicated by corresponding clock references such as DTSs. Additional coded pictures of the program may be removed and decoding may start when corresponding DTSs may mature as described with respect to, for example, FIGS. 2, 3, 4, and 5. To avoid underflow, a coded picture may be decoded only when the data for the coded picture may be available in the CDB 102 as illustrated in FIGS. 2, 3, and 4. Decoded picture may be stored in the DPB 106. The initial decoded pictures may be removed from the DPB 106 for displaying at a time earlier than what may be indicated by clock references such as the PTSs of corresponding initial decoded pictures. Additional decoded pictures may be displayed when the corresponding PTSs may mature. Initial decoded pictures may be displayed at various frame rates converging to a constant frame rate used for displaying additional decoded pictures of the program. The various frame rates may be converged to the constant frame rate within the time period of the initial pictures. As described in FIG. 6, a decoded picture may be displayed only when the corresponding data may be available in the DPB 106. A respective previous picture may be displayed when the decoded picture may not be available in the DPB 106. Depending on implementation, the respective previous decoded picture may be displayed even though the decoded picture may be available in the DPB 106.

In various aspects of the invention, initial coded pictures of a program may be decoded at a time earlier than an intended time that is indicated by respective time stamps of the initial coded pictures. Additional coded pictures of the program may be decoded at a time indicated by respective time stamps of the additional coded pictures. See FIGS. 2, 3, 4, and 5, for example. The earlier time between successive one or more of the initial coded pictures may be reduced such that the earlier time converges to the intended time indicated by the respective time stamps as described in FIG. 4 for the first five coded pictures of the program at the point of A3, B3, C3, D3, and E3, respectively. The initial coded pictures may be removed from a coded data buffer such as the CDB 102 for decoding at the earlier time and the additional coded pictures may be removed from the coded data buffer for decoding at the intended time. One or more of the initial coded pictures or one or more of the additional coded pictures may be decoded after the one or more of the initial coded pictures or the one or more of the additional coded pictures is available in a coded data buffer. The time stamps may comprise decoding time stamps. As explained in FIGS. 2, 3, 4, and 5, for example.

In various aspects of the invention, as described in FIGS. 1A, 1B, and 6, initial decoded pictures of a program may be displayed at a time earlier than an intended time that is indicated by respective time stamps of the initial coded pictures. Additional decoded pictures of said program may be displayed at a time indicated by respective time stamps of the additional decoded pictures and in an intended duration. The earlier time between successive one or more of said initial decoded pictures may be reduced. A display duration for the initial decoded pictures may be extended so that the extended display duration converges to the intended duration. The earlier time between successive one or more of the initial decoded pictures may be reduced so that the earlier time converges to the intended time indicated by the respective time stamps. See FIG. 2,3,4,6, for example. The initial decoded pictures may be removed from a decoded data buffer such as the DPB 106 for displaying at the earlier time and the additional decoded pictures may be removed from the decoded data buffer for displaying at the intended time. One or more of the initial decoded pictures or one or more of the additional decoded pictures may be displayed after the one or more of the initial decoded pictures or one or more of the additional decoded pictures is available in the decoded data buffer. One or more previous picture corresponding to the initial decoded pictures or one or more of the additional decoded pictures may be displayed after the one or more of the initial decoded pictures or one or more of the additional decoded pictures is available in the decoded data buffer. As described in FIGS. 1A, 1B, 2,3,4, and 6. The time stamps may comprise presentation time stamps (PTSs).

Another embodiment of the invention may provide a machine-readable storage, having stored thereon, a computer program having at least one code section executable by a machine, thereby causing the machine to perform the steps as described herein for fast channel change.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of processing a signal, comprising:
decoding initial coded pictures of a program at an earlier time earlier than an intended time that is indicated by respective decoding time stamps of said initial coded pictures;
decoding additional coded pictures of said program at a time indicated by respective decoding time stamps of said additional coded pictures; and
reducing said earlier time between successive one or more of said initial coded pictures such that said earlier time converges to said intended time indicated by said respective decoding time stamps.

2. The method according to claim 1, comprising removing said initial coded pictures from a coded data buffer for decoding at said earlier time and removing said additional coded pictures from said coded data buffer for decoding at said intended time.

3. The method according to claim 2, comprising decoding one or more of said initial coded pictures or one or more of said additional coded pictures after said one or more of said initial coded pictures or said one or more of said additional coded pictures is available in said coded data buffer.

4. A system for processing a signal, comprising:
one or more processors operable to decode initial coded pictures of a program at an earlier time earlier than an intended time that is indicated by respective decoding time stamps of said initial coded pictures;
said one or more processors are operable to decode additional coded pictures of said program at a time indicated by respective decoding time stamps of said additional coded pictures;
and said one or more processors are operable to reduce said earlier time between successive one or more of said initial coded pictures such that said earlier time converges to said intended time indicated by said respective decoding time stamps.

5. The system according to claim 4, wherein said one or more processors are operable to remove said initial coded pictures from a coded data buffer for decoding at said earlier time and removing said additional coded pictures from said coded data buffer for decoding at said intended time.

6. The system according to claim 5, wherein said one or more processors are operable to decode one or more of said initial coded pictures or one or more of said additional coded pictures after said one or more of said initial coded pictures or said one or more of said additional coded pictures is available in a coded data buffer.

7. A method of processing a signal, comprising:
decoding initial coded pictures of a program at an earlier time earlier than an intended time that is indicated by respective decoding time stamps of said initial coded pictures, wherein the decoding of an initial coded picture of the program is completed before the respective decoding time stamp matures; and
decoding additional coded pictures of said program at a time indicated by respective decoding time stamps of said additional coded pictures.

8. The method according to claim 7, wherein said coded pictures are associated with respective presentation time stamps.

9. The method according to claim 1, comprising removing an initial coded picture from a coded data buffer for decoding at said earlier time when a next coded picture of the program is completely available in the coded data buffer.

10. The method according to claim 9, wherein removing the initial coded picture from the coded data buffer for decoding is delayed until the next coded picture of the program is completely available in the coded data buffer.

11. The method according to claim 1, wherein the earlier time earlier than the intended time that is indicated by the respective decoding time stamp does not exceed an allowable decoding timing advance.

12. A system for processing a signal, comprising:
one or more processors operable to decode initial coded pictures of a program at an earlier time earlier than an intended time that is indicated by respective decoding time stamps of said initial coded pictures, wherein the decoding of an initial coded picture of the program is completed before the respective decoding time stamp matures; and said one or more processors are operable to decode additional coded pictures of said program at a time indicated by respective decoding time stamps of said additional coded pictures.

13. The system according to claim 4 or claim 12, wherein said coded pictures are associated with respective presentation time stamps.

14. The system according to claim 4, wherein said one or more processors are operable to remove an initial coded picture from a coded data buffer for decoding at said earlier time when a next coded picture of the program is completely available in the coded data buffer.

15. The system according to claim 14, wherein said one or more processors are operable to remove the initial coded picture from the coded data buffer for decoding is delayed until the next coded picture of the program is completely available in the coded data buffer.

16. The system according to claim 4, wherein the earlier time earlier than the intended time that is indicated by the respective decoding time stamp does not exceed an allowable decoding timing advance.

17. The method according to claim 7, comprising reducing said earlier time between successive one or more of said initial coded pictures.

18. The system according to claim 12, wherein said one or more processors are operable to reduce said earlier time between successive one or more of said initial coded pictures.

\* \* \* \* \*